A. L. SMITH.
FRICTION CLUTCH.
APPLICATION FILED NOV. 13, 1907.
932,340.
Patented Aug. 24, 1909.
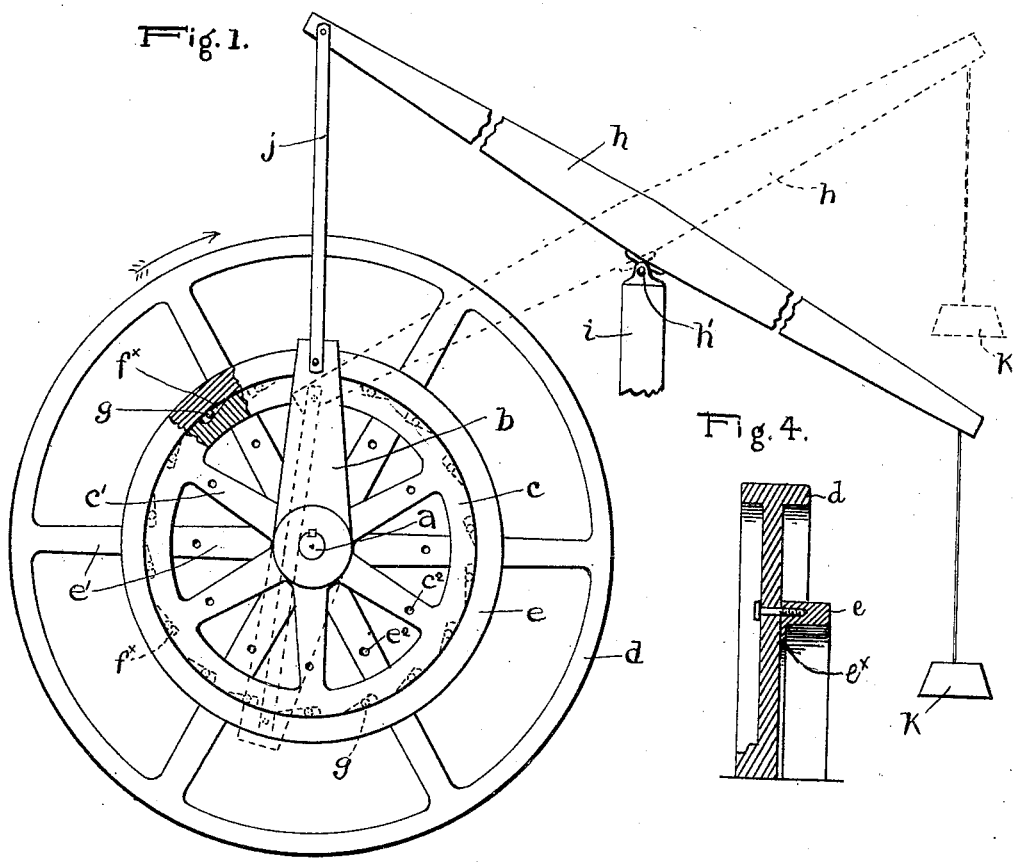
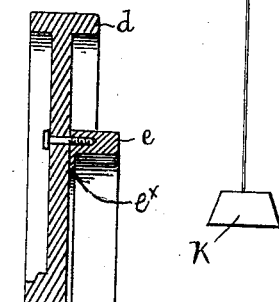
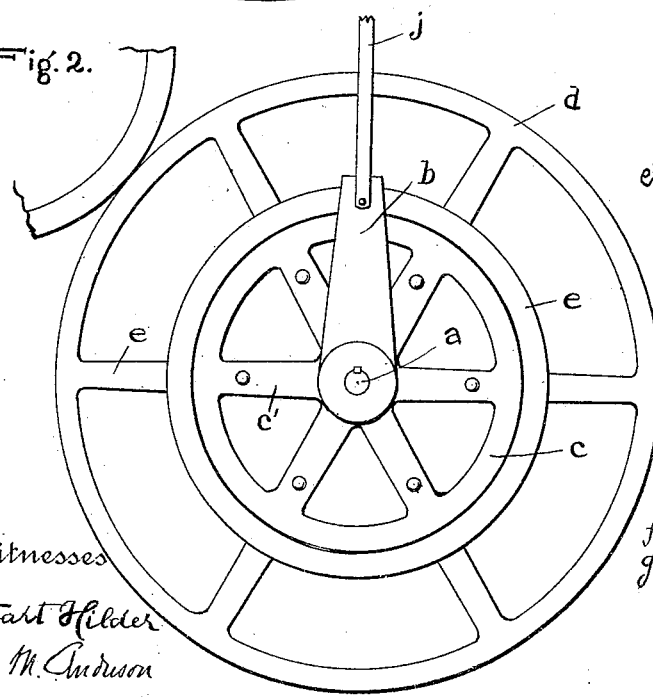
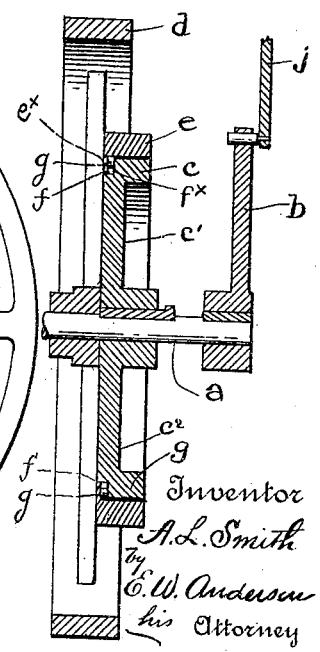
Witnesses
Stuart Hilder
George M. Anderson
Inventor
A. L. Smith
by E. W. Anderson
his Attorney

UNITED STATES PATENT OFFICE.

ARTHUR L. SMITH, OF McCONNELSVILLE, OHIO.

FRICTION-CLUTCH.

932,340.  Specification of Letters Patent.  Patented Aug. 24, 1909.

Application filed November 13, 1907. Serial No. 401,949.

*To all whom it may concern:*

Be it known that I, ARTHUR L. SMITH, a citizen of the United States, resident of McConnelsville, in the county of Morgan and State of Ohio, have made a certain new and useful Invention in Friction-Clutches; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention relates to friction clutches and it consists in the novel construction and combinations of parts as hereinafter set forth.

In the accompanying drawings, illustrating the invention, the clutch is shown as used in connection with drilling machinery.

In these drawings the letter $a$, designates the central rotary shaft having fast thereon a crank $b$, and a clutch member $c$, forming the inside fast member of the clutch.

$d$, is the driving pulley loosely mounted upon the shaft $a$, and forming the loose clutch member, said pulley having secured laterally thereto an annulus $e$, having an inner annular extension $e^\times$. The clutch member $c$, has formed in the inner portion of its peripheral surface an annular corner depression $f$, open upon two sides and into which open a series of wedge shaped notches $f^\times$, also open upon two sides and which are closed at one side by the annulus $e$, and at the other side by the extension $e'$, thereof which fits closely within the corner depression $f'$. In these wedge-shaped notches $f^\times$, are arranged wedges or rolls $g$. Thus upon rotation of the loose pulley $d$, and the annulus carried thereby, the wedges or rolls will be forced outward in the wedge shaped notches against the inner surface of said annulus, and form a driving connection between the fast and loose members of the clutch.

$h$, is an intermediately pivoted lever or beam having its pivot or fulcrum at $h'$, upon stationary post $i$, such beam or lever having at one end thereof a pitman connection $j$, with the free end of the crank arm $b$, and at its opposite end having a suspended weight $k$, or a drilling tool (not shown).

In the operation of the clutch, upon rotation of the loose pulley $d$, in the direction of the arrow, the clutch will be effected, and the crank arm $b$, which normally lies vertically above the shaft $a$, will turn with the shaft until it occupies a position vertically below the same or until it completes a one-half turn, at the same time depressing the inner end and raising the outer end of the beam $h$, to a distance or height which is regulated by the length of the beam and of the crank arm. The crank arm $b$, will pass the lower center, and thereupon the weight of the suspended drilling tool $k$, acting through the pivoted beam and crank arm upon the fast member of the clutch, will retract such fast member sufficiently to release the clutch of the two members, when the drilling tool will instantaneously fall to the surface being drilled and through its acquired momentum will effectually act upon the same. Upon reversing the direction of rotation of the pulley $d$, the clutch will be released.

The spokes $c'$, and $e'$, of the clutch member $c$, and the driving pulley, may have perforations $c^2$, and $e^2$, provided therein at a similar distance from the shaft $a$, allowing for bolt connection of such parts through the spoke perforations, as shown in the figure of the drawing, when the parts may be rotated in either direction without disconnection of the pitman $j$.

In case the clutch is used in bailing or reeling a friction pulley is used, having contact with the rim of pulley $d$.

In the use of this device there will be an automatic intermittent clutch and release which will elevate the drill and cause it to fall unchecked in an intermittent manner thus causing the drill to hit bottom with great force. A greater amount of work may be thus accomplished in the same time as with methods of drilling now in use, and inasmuch as the engine is working only one half of the time, or during the elevation of the drilling tool, wear and tear thereupon is proportionately decreased and fuel saved. The drill will strike the surface being worked with a force which will not be affected by the speed of the engine or rotation of the pulley $d$, and the drill may be suspended from the beam with either ordinary rope, wire cable or a solid rod without affecting its proper operation. The wedge shaped notches of the clutch make it self adjustable with regard to wear.

Having described the invention, what I claim and desire to secure by Letters Patent is:

In a friction clutch, a rotary shaft, a fast clutch member having an annular corner depression open upon two sides and wedge-form notches also open upon two sides and opening into said depression, a loose driving pulley upon said shaft having a laterally projecting annulus overlying one of the open sides of each wedge-form notch, said annulus having an annular inward extension overlying the other open side of each wedge-form notch and fitting closely within said depression, and wedging devices in the wedge-form notches having when thrown out bearing against said annulus.

In testimony whereof I affix my signature, in presence of two witnesses.

ARTHUR L. SMITH.

Witnesses:
H. M. FINLEY,
C. W. NAYLOR.